Figure 1:
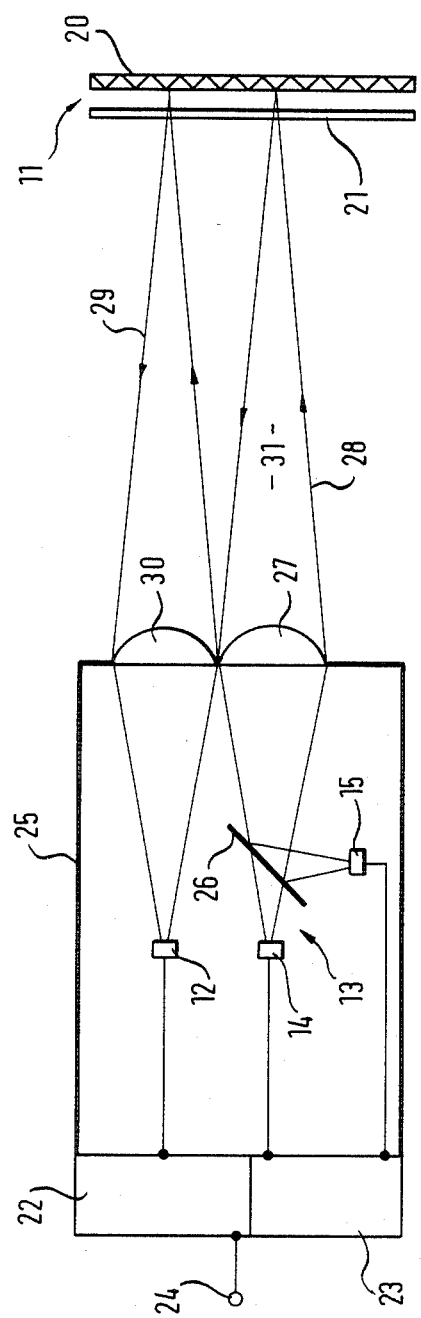

United States Patent [19]

Bechtel

[11] Patent Number: 4,546,246

[45] Date of Patent: Oct. 8, 1985

[54] LIGHT BARRIER WITH SPECTRALLY FILTERED REFLECTION MEANS

[75] Inventor: Klaus Bechtel, Worms, Fed. Rep. of Germany

[73] Assignee: Erwin Sick GmbH Optik-Elektronik, Waldkirch, Fed. Rep. of Germany

[21] Appl. No.: 534,279

[22] Filed: Sep. 21, 1983

[30] Foreign Application Priority Data

Oct. 6, 1982 [DE] Fed. Rep. of Germany ....... 3237035

[51] Int. Cl.$^4$ ........................ G08B 13/18; G06M 7/00
[52] U.S. Cl. ................................... 250/221; 340/556; 250/226
[58] Field of Search ................. 250/221, 222.1, 222.2, 250/226; 340/556, 567, 568

[56] References Cited

U.S. PATENT DOCUMENTS

| | | | |
|---|---|---|---|
| 3,842,257 | 10/1974 | Köhler | 250/221 |
| 3,862,415 | 6/1975 | Harnden, Jr. et al. | 250/221 |
| 3,944,818 | 3/1976 | Bechtel | 340/556 |
| 4,224,608 | 9/1980 | Lederer | 340/556 |

Primary Examiner—David C. Nelms
Assistant Examiner—J. Jon Brophy

[57] ABSTRACT

A reflection light barrier for recognizing also strongly reflecting articles has at one side of a monitored region a light transmitter (13) which is combined with a light receiver (12) and, at the other end of the monitored region, a reflecting device (11). The reflecting device (11) has optical filter characteristics so that the spectral distribution of the light beam is changed on reflection. An electronic processing circuit only produces a signal following the incidence of reflected light on the receiver when the spectral distribution does not correspond with the spectral distribution of light reflected from the reflecting device.

10 Claims, 3 Drawing Figures

LIGHT BARRIER WITH SPECTRALLY FILTERED REFLECTION MEANS

The invention relates to a reflection light barrier for recognising articles, including strongly reflecting articles, within a monitored region through which a light beam passes, wherein a light transmitter for transmitting the light beam and a light receiver including a photoelectric converter are arranged at one location, wherein a reflecting device on which the light beam falls and which changes the state of the transmitted light beam and reflects it directly to the receiver is arranged at an other location, and wherein an electronic processing circuit is connected to the light receiver, with said electronic processing circuit transmitting a signal on interruption of the monitored region and on the incidence of light reflected onto the light receiver from an article located in the monitored region.

A reflection light barrier of this kind is already known from German Auslegeschrift No. 2824583. In this known reflection light barrier a polariser is arranged at the light transmitter and an analyser turned through 90° is arranged at the light receiver. The reflecting device is so constructed that it changes the state of polarisation of the reflected light. In this manner it is possible to distinguish between reflections at the reflector and reflections at an article with a shiny surface introduced into the monitored region. The reliable functioning of the known reflection light barrier is however restricted to autocollimation light barriers. Furthermore, it is necessary that the surfaces of the reflecting articles do not exert any influence on the polarisation of the reflected light.

In addition a device is known for monitoring railway level crossings (German Offenlegungsschrift No. 2238049) by means of a light beam which is deflected back and forth across the level crossing. The reflector, which reflects light directly to the light receiver, is provided with a delay layer which rotates the plane of polarisation. In this way it is possible to distinguish between articles located in the monitored region and light reflected from this reflector. This known light barrier has however the disadvantage that under certain circumstances specularly reflecting articles present in the monitored region can rotate the plane of polarisation in such a way that the receiver can receive sufficient light to transmit a signal indicating that the crossing is free even though an article is in fact located in the monitored region.

The principal object underlying the present invention is thus to provide a reflection light barrier of the initially named kind in which articles, and in particular strongly reflecting articles, can be reliably detected independently of the state of polarisation of the light that is used and independently of the way in which the reflecting device influences the state of polarisation of the reflected light. Moreover, characteristics of the articles introduced into the beam path which affect the state of polarisation should have no influence on the recognition or non-recognition of the presence of those articles.

In order to satisfy this object the invention provides that the reflecting device should have optical filter characteristics in such a way that the spectral distribution of the light reflected thereby is changed; and that the processing circuit only transmits said signal following incidence of light on the light receiver when the spectral distribution of this light does not correspond to the spectral distribution of the light reflected from the reflecting device.

The invention thus starts from the recognition that it is always possible to select the spectral distribution of the transmitted light, and the change in this spectral distribution brought about by the reflecting device, so that articles introduced into the monitored region do not change the spectral distribution of the light reflected thereby in the same way as the reflecting device. In this connection it is only necessary, under certain circumstances, to take account of the colour of the articles that are introduced into the light barrier, in the sense that the colour of the articles should not be allowed to produce a change of spectral distribution in the same manner or in approximately the same manner as the reflecting device.

The spectral range of the light transmitter should therefore be so selected that the strongly reflecting articles that are to be recognised reflect at least a substantial part of the spectral ranges of the incident light to the receiver, whereas the reflecting device only returns a well defined fraction of these spectral ranges to the receiver.

It is entirely possible to provide the different spectral ranges solely by suitable filter measures at the receiver so that, for example, white light is used as the transmitted light beam from which two, more or less broad, spectral ranges are blended out (distinguished) at the receiver side.

Two photoelectric converters can be provided at the receiver side each of which receives light from one of the two spectral ranges. It is however also possible to use only one photoelectric converter and to arrange this converter so that it alternately receives light of first the one and then of the other spectral ranges, with the separation between the spectral ranges then taking place in the subsequent processing circuit.

In accordance with a first preferred embodiment it is envisaged that the light transmitter periodically and alternately transmits light in different, non-overlapping spectral ranges, and that the reflecting device only reflects light of the one spectral range. In this manner one only needs a single photoelectric converter in the light receiver. A further advantage lies in the fact that, by working with pulsed light, the influence of environmental light can be eliminated in the electronic processing circuit in simple manner by a capacitive coupling.

Although the different spectral ranges can fundamentally be provided by a rotating filter or the like, it is however preferred for the light transmitter to have two light sources with the different spectral ranges.

The two light sources can expediently take the form of semiconductor diodes, for example one can use a GaAs diode with a transmission wavelength of 940 nm and a GaP diode with a transmission wavelength of 660 nm.

The two light sources are preferably so pulsed that at any one time only one of the two transmits light. Preferably pauses are inserted between the light transmissions from the individual light sources.

A preferred electronic processing circuit has two monoflops connected one after the other, of which the first has a shorter and the second a longer holding time than the period of the pulses. The pulse sequences of the two light sources are advantageously displaced by one half of the pulse period. In front of each monoflop there should preferably be connected a differentiating stage which only responds to one of the pulse flanks.

The reflecting device which influences the spectral state of the transmitted light can advantageously consist of a reflector with a filter positioned in front of it. The filter is expediently arranged obliquely to the optical axis so that light reflected at the surface of the filter cannot enter into the receiver.

Figure 2:
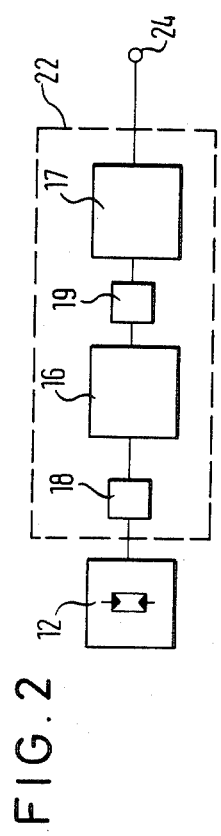
Figure 3:
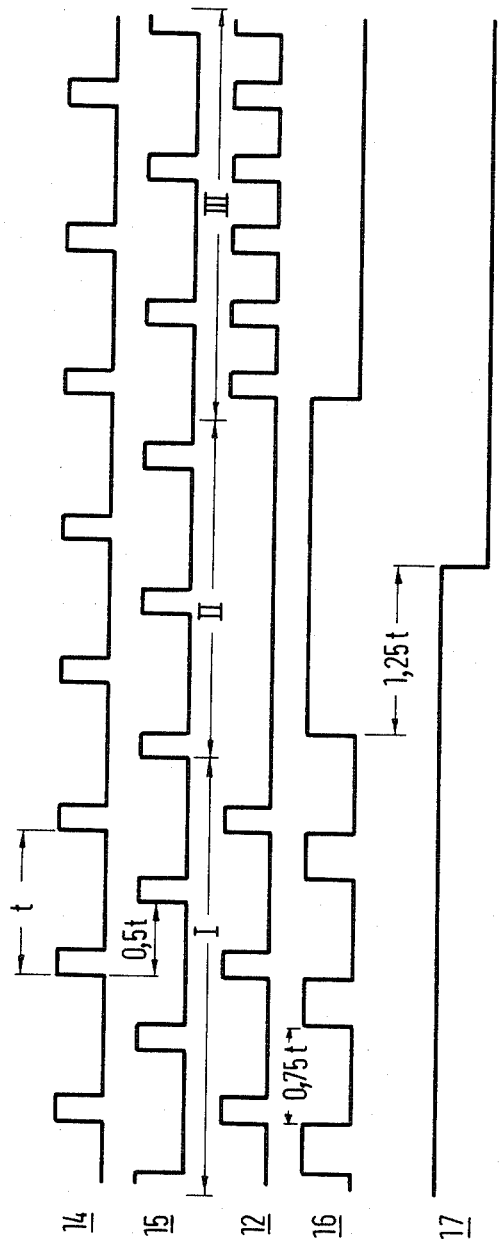

The invention will now be described in the following by way of example and with reference to the drawings, which show:

FIG. 1 a schematic side view of a reflection light barrier in accordance with the invention and with an attached electronic processing circuit, FIG. 2 a schematic block circuit diagram of the electronic processing circuit connected to the receiver, and FIG. 3 pulse diagrams of the individual electronic components shown in FIGS. 1 and 2.

As seen in FIG. 1 a light transmitter 13 and a light receiver 12 are arranged alongside one another in a housing 25. The representation will be understood to be purely schematic, i.e. the customary intermediate optical imaging elements such as condensors and the like have been omitted for the sake of simplicity.

The light transmitter 13 consists, in accordance with the invention, of two semiconductor diodes and indeed a GaAs diode 14 and a GaP diode 15 which are arranged with their optical ax s at right angle to one another. The GaAs diode transmits light with a wavelength of 940 nm, the GaP diode 15 transmits light with a wavelength of 660 nm.

The light coming from the two diodes 14, 15 is united by a beam divider 26 and passes to a front transmitting objective 27 which transmits a substantially parallel transmitted light beam 28 through a monitored region 31 (along a monitored path) to a reflecting device 11.

The reflecting device 11 consists of a retroreflector 20 and a filter 21 arranged in front of the retroreflector. The retroreflector 20 reflects the transmitted light beam back on itself within a narrow scattering cone. As a result of this scattering cone a substantially parallel reflected beam 29 also reaches a receiver front objective 30 arranged directly alongside the transmitter front objective 27. This receiver front objective 30 concentrates the received light, if desired via non-illustrated intermediate images, onto a light receiver 12 formed by a photoelectric converter. The angle between the transmitted light beam 28 and the reflected light beam 29 is greatly exaggerated in the representation of FIG. 1; in fact this angle is negligibly small in view of the generally large length of the monitored region 31, so that one can speak of a quasi-autocollimation light barrier. If necessary, the received light could also pass through the transmission front objective, in this case it would then be necessary to arrange a further beam divider in the transmitted light beam in order to separate the transmitted and received light.

As can be seen from FIG. 2 the light receiver 12 is connected to an electronic processing circuit 22 which contains a series circuit, a first differentiating member 18, a first monoflop 16, a second differentiating member 19 and a second monoflop 17, with the output of the second monoflop 17 forming the output 24 of the electronic processing circuit 22. The differentiating members or stages 18, 19 respond only to one flank, and preferably to the positive flank of the rectangular pulses which are passed to them.

As seen in FIG. 1 a supply apparatus (power supply) 23 is also provided which energises the semiconductor diodes 14, 15 with a pulsed voltage in the manner described in the following.

FIG. 3 shows a representation of the pulse diagrams of the various electronic components as a function of time, with the time scale being the same in all five diagrams so that vertically aligned pulse features occur at the same time. In front of each diagram there is provided an underlined reference numeral which refers in each case to the particular electronic component to which the pulse diagram relates.

As seen in FIG. 3 the semiconductor diodes 14, 15 are supplied by the supply apparatus 23 with a rectangular pulse voltage which has a period t. The phase of the two pulse sequences is displaced by the amount 0.5 t so that the pulses of the GaP diode 15 always fall in a gap between two rectangular pulses of the GaAs diode 14.

Three different cases are now distinguished in the diagrams of FIG. 3. The region I shows the voltages at the receiver 12 and also at the monoflops 16, 17 for a free monitored region 31. The region II shows how the receiver and the monoflops 16, 17 react when a nonreflecting object or a poorly reflecting object is located in the monitored region 31. Finally, the region III shows the conditions which prevail when a strongly reflecting object is arranged in the monitored region 31.

It is important to point that the monoflops 16, 17 have different holding times. The monoflop 16 has a holding time of 0.75 t, the monoflop 17 a holding time of 1.25 t. It should also be remarked that the monoflops are retriggerable and can therefore be termed resettable time elements. For each new set pulse these monoflops start to run again from scratch until the selected holding time of 0.75 t or 1.25 respectively has passed.

The filter 21 is now so tuned that it only transmits the 940 nm radiation of the GaAs diode 14, but not however the light transmitted by the GaP diode 15 at a wavelength of 660 nm.

The manner of operation of the described reflection light barrier is as follows:

First of all it should be assumed that no article is present in the monitored region 31 so that the apparatus find itself in the operating region I of FIG. 3. The two semiconductor diodes 14, 15 transmit the pulse sequences illustrated in the two diagrams 14, 15. The light receiver 12 receives however in the operating region I only the reflected pulses originating from GaAs diode 14, because the light pulses of the GaP diode 15 are not transmitted by the filter 21.

In accordance with the diagram 12 the positive flank of the received pulses bring about, via the differentiating member 18, the setting of the monoflop 16 as illustrated in the pulse diagram 16 in FIG. 3. The monoflop 16 then drops out again after a holding time of 0.75 t until it is once again set by the next received pulse. In this manner the pulse sequence shown in diagram 16 of FIG. 3 occurs at the output of the monoflop 16.

The second monoflop 17 is controlled via the second differentiating member 19, which only responds to the positive flanks of the pulse sequence 16 and this monoflop 17 has a holding time of 1.25 t. The monoflop 17 is set at some time prior to the start of the representation of FIG. 3. As after each period t a new setting pulse occurs while the holding time of the monoflop 17 is 1.25 t it remains permanently set in the operating condition I. This state can be used at the output 24 as an indication of a free monitored region 31.

If now, in the operating condition II an object which is either non-reflective or only has a very small reflection capability is inserted into the monitored region 31 the received pulses in diagram 12 are entirely absent. The consequence is that the monoflop 16 will not be reset after the last holding time has expired and this is illustrated in region II in FIG. 3 by a continuous line.

After an object has been introduced into the monitored region 31 the monoflop 17 initially remains in the set condition during the holding time of 1.25 t. It then likewise drops out and remains in the unset condition as long as the object is located in the monitored region 31. The non-set condition of the monoflop 17 thus provides an indication at the output 24 of the presence of an article in the monitored region 31 which is either non-reflective or only poorly reflecting.

In the operating condition III it is assumed that a strongly reflecting object is present in the monitored region 34. In this case both the light pulses of the GaAs diode 14 and also the light pulses of the GaP diode 15 are reflected to the receiver 12, so that the receiver 12 transmits a pulse sequence with double frequency which is illustrated in the right hand part of the diagram 12 in FIG. 3. Setting pulses for the monoflop 16 are now always present after the expiry of a time of 0.5 t, that is to say that this monoflop will always be continuously reset before its holding period has expired. In other words the monoflop 16 is permanently set in this operating condition and this is illustrated in the right hand part of the diagram 16 by a continuous lower line.

As in this condition no pulses are present at the output of the monoflop 16, the monoflop 17 no longer receives setting pulses, so that it remains in the unset condition. This signifies that the same (non-set) signal is present at the output 34 following the introduction of a strongly reflecting article into the monitored region 31 as occurs when a weakly or non-reflecting object is introduced into this monitored region.

The invention is also based on the recognition that for shiny or specularly reflecting articles in the monitored region the danger of spectral change of the transmitted light is not very relevant, and that in any case spectral ranges can be found which will, in every case, be reflected by the shiny or specularly reflecting articles. Only diffuse reflecting articles will frequently lead to a change in the spectral distribution of the reflected light. However, in these cases, faulty operation of the light barrier will in any event not occur due to the loss of intensity which occurs.

I claim:

1. A reflection light barrier for recognising articles, including strongly reflecting articles, within a monitored region through which a light beam passes, wherein a light transmitter for transmitting the light beam and a light receiver including a photoelectric converter are arranged at one location, wherein a reflecting device on which the light beam falls and which changes the state of the transmitted light beam and reflects it directly to the receiver is arranged at another location, and wherein an electronic processing circuit is connected to the light receiver, with said electronic processing circuit transmitting a signal on interruption of the monitored region and on the incidence of light reflected onto the light receiver from an article located in the monitored region, characterised in that the reflecting device (11) has optical filter characteristics in such a way that the spectral distribution of the light reflected thereby is changed; and in that the processing circuit only transmits said signal following incidence of light on the light receiver when the spectral distribution of this light does not correspond to the spectral distribution of the light reflected from the reflecting device.

2. A reflection light barrier in accordance with claim 1, characterised in that the light transmitter (13) periodically and alternately transmits light with different, non-overlapping, spectral ranges, and in that the reflecting device (11) only reflects light in one of the spectral ranges.

3. A reflection light barrier in accordance with claim 2, characterised in that the light transmitter (13) has two light sources (14, 15) with the different spectral ranges.

4. A reflection light barrier in accordance with claim 3, characterised in that the two light sources are semi-conductor diodes (14, 15).

5. A reflection light barrier in accordance with claim 4, characterised in that the two light sources (14, 15) are pulsed so that at any one point in time only one of the two light sources transmits light.

6. A reflection light barrier in accordance with claim 5, characterised in that the electrical processing circuit (FIG. 2) has two monoflops (16, 17) connected one after the other, of which the first (16) has a shorter and the second (17) a longer holding time than the period (t) of the pulses.

7. A reflection light barrier in accordance with claim 6, characterised in that the pulse sequences of the two light sources (14, 15) are displaced by one half of the period (t) of the pulses.

8. A reflection light barrier in accordance with claim 6 and characterised in that in front of each monoflop (16, 17) there is connected a differentiating stage (18, 19) which only responds to one of the pulse flanks.

9. A reflection light barrier in accordance which claim 1, characterised in that the reflecting device consists of a reflector (20), in particular a retro-reflector with a filter (21) positioned in front of it.

10. A reflection light barrier in accordance with claim 9, characterised in that the filter (21) is arranged obliquely to the optical axis.

* * * * *